F. TYSON.
ICE CREAM FREEZER.
APPLICATION FILED JULY 7, 1911.
1,071,371.
Patented Aug. 26, 1913.
2 SHEETS—SHEET 1.
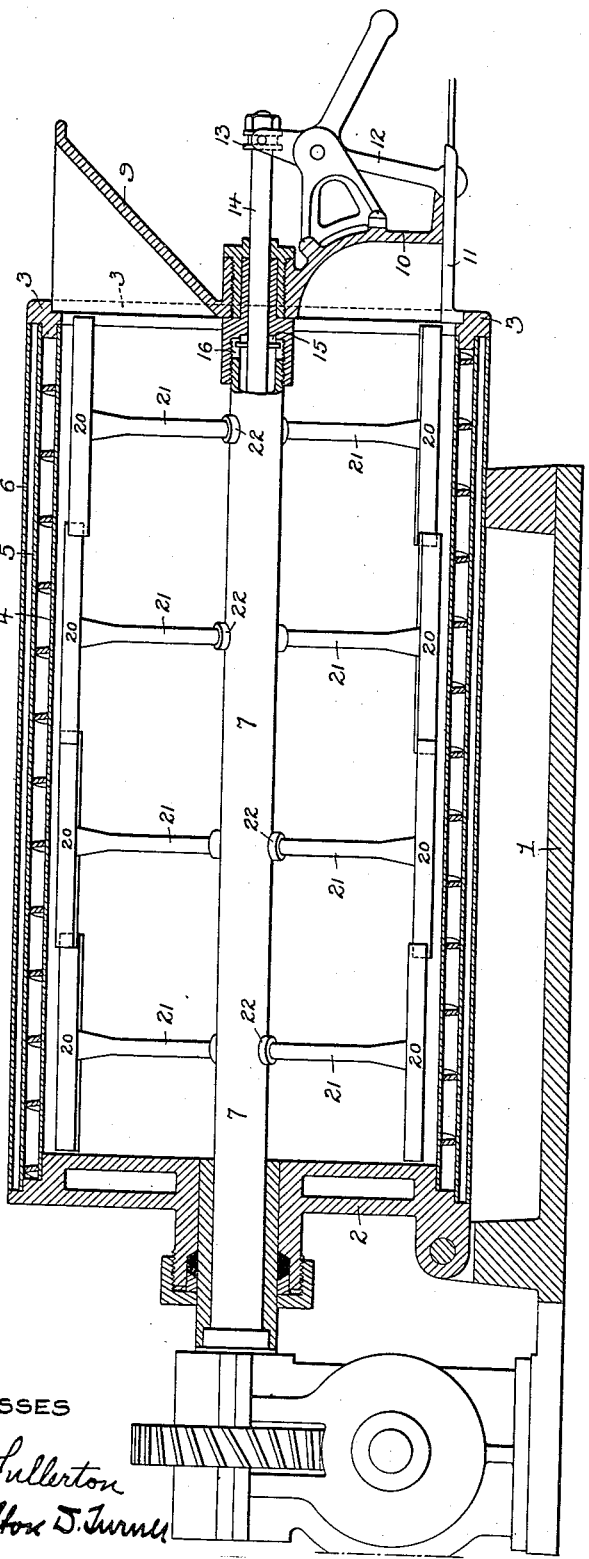
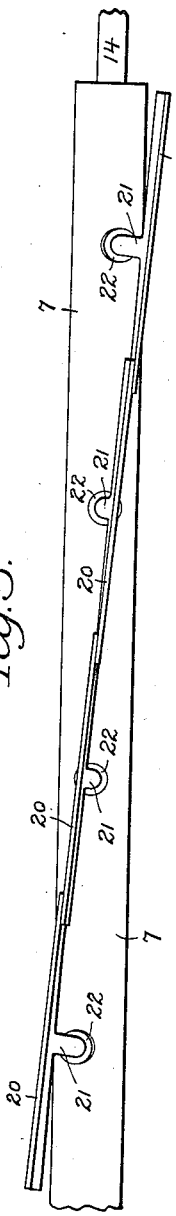
WITNESSES
Elsie Fullerton
Hamilton J. Turner
INVENTOR
FRANK TYSON
BY HIS ATTORNEY
Harry Smith

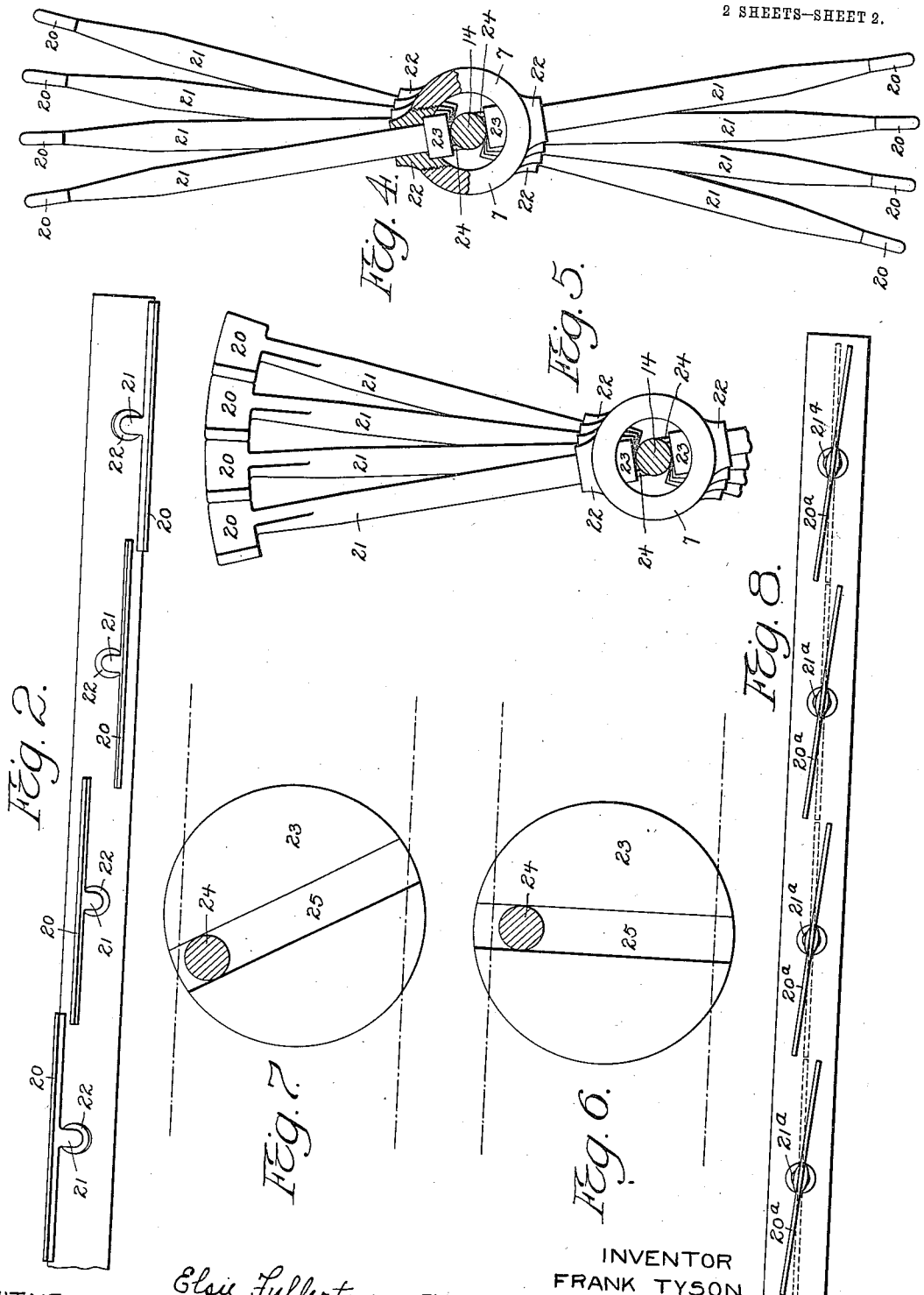

UNITED STATES PATENT OFFICE.

FRANK TYSON, OF CANTON, OHIO, ASSIGNOR TO THE TYSON COMPANY, OF CANTON, OHIO, A CORPORATION OF OHIO.

ICE-CREAM FREEZER.

1,071,371.  Specification of Letters Patent.  Patented Aug. 26, 1913.

Application filed July 7, 1911. Serial No. 637,383.

*To all whom it may concern:*

Be it known that I, FRANK TYSON, a citizen of the United States, and a resident of Canton, Ohio, have invented certain Improvements in Ice-Cream Freezers, of which the following is a specification.

My invention consists of certain improvements in the ice cream freezer forming the subject of my Letters Patent No. 855,364, dated May 28, 1907, the improvements relating particularly to that feature of the patented invention which comprised the blade adjustable either to a position parallel with the axis of the shaft, to serve as a beater, or to a position inclined in respect to the axis of the shaft, to serve as an ejector, the object of my present invention being to attain the same result by the use of a series of blades in place of the continuous blade shown in the former patent. This object I attain in the manner hereinafter set forth, reference being had to the accompanying drawings, in which—

Figure 1 is a longitudinal sectional view of sufficient of an ice cream freezer to illustrate my present invention; Fig. 2 is a plan view of part of the shaft of the freezer with the blades adjusted thereon to serve as beaters; Fig. 3 is a similar view showing said blades adjusted to serve as an ejector; Fig. 4 is an enlarged view of the shaft and its blades, partly in end elevation and partly in section, the blades being adjusted to the position shown in Fig. 2; Fig. 5 is an enlarged view of the shaft and one set of blades, the latter being adjusted to the position shown in Fig. 3; Figs. 6 and 7 are enlarged diagrams illustrating the blade-shifting devices in the two extreme positions, and Fig. 8 is a view similar to Fig. 3 but illustrating a modification of my invention.

In Fig. 1 of the drawing, 1 represents the bed of the machine, upon which is mounted the cylindrical freezer casing comprising opposite heads 2 and 3 and a triple shell composed of cylindrical members 4, 5 and 6, the heads 2 and 3 providing bearings for the central shaft 7 which is rotated in any suitable way, and the head 3 being also provided with a feed hopper 9 and a delivery nozzle 10, the latter having a valve 11 which is engaged by one arm of a lever 12, another arm of said lever engaging a grooved collar 13 on a rod 14, centrally disposed in the hollow shaft 7 and caused to rotate therewith in any suitable way which will not restrict its independent longitudinal movement, the means shown in the present instance for effecting this object being a transverse pin 15 carried by the rod and entering slots 16 formed in the shaft 7, as shown in Fig. 1. The shaft 7 is provided with blades which are intended to act either as beaters or as ejectors for the frozen cream, two sets of these blades being shown in the present instance, but as they are alike in construction and operation a description of one set of them will suffice. Each set is composed of a number of blades 20 and may consist of any desired number of these blades, four being shown in the present instance. Each blade 20 has a central stem 21 projecting radially from the shaft 7, and mounted so as to be free to rotate on its axis in a bearing plug 22 screwed into an opening in the shaft, outward movement of the blade being prevented by a head 23 located at the inner end of the stem 21 and fitting in a socket formed in the inner portion of the bearing plug 22, as shown in Fig. 4. Inward movement of either blade is prevented by contact of its head 23 with the central rod 14 in the shaft, and movement of partial rotation of each stem 21 around its axis can be effected by means of a pin 24 projecting from the rod 14 and entering an inclined slot 25 formed in the inner face of the head 23, as shown in Figs. 6 and 7.

The stems 21 of the blades 20 project from the shaft 7 at different angles, as shown in Figs. 4 and 5, and it will be understood that the pins 24 of the rod 14 are likewise disposed at different angles so that each pin will engage with the slotted head of its corresponding stem 21 at a point to one side of the axial center of the head, whereby longitudinal movement of the rod 14 will effect a partial turning movement of the slotted head 23 and of the stem 21 and blade 20 corresponding thereto.

When the rod 14 is at one extreme of its movement the slotted heads 23 and pins 24 may bear the relation to each other shown in Fig. 6, which relation may correspond with an adjustment of the blades 20 into position parallel with one another and with the axial line of the shaft 7, as shown in Fig. 2, the blades, when in this position serving as beaters for the contents of the freezing vessel. Movement of the rod 14 to its other extreme position causes the slotted heads 23 and pins 24 to assume the relation indicated in Fig. 7, which may correspond with an adjustment of the blades 20 into positions diagonal to the axial line of the shaft, as shown in Fig. 3, whereby the various blades combine to form a spiral blade which will act as an ejector for the frozen cream, the same movement of the rod which effected this adjustment of the blades being accompanied by an opening movement of the valve 11 which normally closes the discharge nozzle 10 of the machine, while movement of the rod intended to restore the blades to beating position is attended by the closing of said valve 11.

While I prefer to dispose the stems of the various blades so that they will project at different angles from the shaft 7 this is not essential to the proper carrying out of my invention, as all of said stems may, if desired, be arranged on the axial line of the shaft, as shown for instance at 21ª in Fig. 8, partial turning movement of the stems effecting adjustment of the blades 20 either to the ejecting position shown by full lines in Fig. 8 or to the beating position shown by dotted lines in said figure.

I claim:

1. An ice cream freezer shaft having a plurality of blades disposed in succession along the shaft and adjustable into different positions in respect to the axial line of the shaft, and means for effecting simultaneous adjustment of all of said blades.

2. An ice cream freezer shaft having a plurality of blades disposed in succession along the shaft and adjustable into different positions in respect to the axial line of the shaft, and means contained within the shaft for effecting such adjustment of the blades.

3. An ice cream freezer shaft having a plurality of projecting stems, each with a blade at its outer end, and means for effecting partial rotation of each of said stems around its axis.

4. An ice cream freezer shaft having a plurality of stems projecting therefrom and turning in bearings on the shaft, and devices within the shaft for effecting partial rotation of said stems.

5. An ice cream freezer shaft provided with stems projecting at different angles therefrom, and each having a blade at its outer end, said blade being adjustable into different positions in respect to the axial line of the shaft.

6. An ice cream freezer shaft having a plurality of stems projecting therefrom, and mounted in pivotal bearings on the shaft, each of said stems carrying at its outer end a blade and said blades being so disposed that when their stems are in one position said blades will be parallel with each other and with the axial line of the shaft, and when the stems are in the other position said blades will be parallel with each other but inclined in respect to the axial line of the shaft.

7. An ice cream freezer shaft having a plurality of stems projecting therefrom at different angles and each pivotally mounted in a bearing on the shaft, each stem having a blade at its outer end, and means for turning the stems whereby the blades may be adjusted to form a spiral blade, or to different planes parallel with one another and with the axial line of the shaft.

8. An ice cream freezer shaft having a detachable plug therein, a blade having a stem free to turn in said plug, and means within the shaft for engaging the inner end of said stem to effect partial rotation of the same.

9. An ice cream freezer shaft having a detachable plug therein, and a blade having a stem mounted so as to be free to turn in said plug and having a head at the inner end for contact with said plug.

10. An ice cream freezer shaft having a detachable plug therein, a blade having a stem mounted so as to be free to turn in said plug and having, at its inner end, a head contacting with the plug, a central rod in said shaft also contacting with the head of the stem, and means whereby longitudinal movement of said rod effects partial turning movement of the stem in its bearing.

11. An ice cream freezer shaft having a blade with stem mounted so as to be free to turn in a bearing on said shaft and having a transverse slot at its inner end, and a rod contained within the shaft, and having a projecting pin for engagement with said slot whereby the longitudinal movement of the shaft effects partial rotary movement of the stem in its bearing.

12. An ice cream freezer shaft having a blade with a stem mounted so as to be free to turn in a bearing on said shaft, a longitudinal rod contained within the shaft and engaging the latter so as to be caused to rotate therewith but free to move longitudinally, and means whereby said longitudinal movement of the rod is caused to effect partial rotating movement of the stem of the blade.

13. An ice cream freezer shaft having a plurality of stems projecting therefrom at different angles, each stem carrying at its outer end a blade and being rotatably mounted in a bearing on the shaft at its inner end, a rod contained within said shaft, and means whereby movement of said rod is transmitted to the stems of the blades to cause partial rotative movement of each of the latter in its bearing.

14. In an apparatus of the character specified, a receptacle for the material to be frozen, and a shaft mounted to rotate in said receptacle, said shaft provided with a series of blades projecting at an angle therefrom to form a beater and means for adjusting the angularity of said blades during the operation of the machine to convert the beater into a conveyer.

15. In an apparatus of the character specified, a rotary beater comprising a shaft, with means for rotating same on its longitudinal axis, and a series of blades mounted on said shaft at right angles to said axis, and provided with means for simultaneously adjusting the angularity of the blades to convert the beater into a conveyer.

16. An ice cream freezer shaft having a blade with a stem mounted so as to be free to turn in a bearing on said shaft, a longitudinal rod contained within the shaft and engaging the stem, and means whereby longitudinal movement of the rod is caused to effect partial rotating movement of the stem of the blade.

In testimony whereof, I have signed my name to this specification in the presence of two subscribing witnesses.

FRANK TYSON.

Witnesses:
KATE A. BEADLE,
HAMILTON D. TURNER.